(12) United States Patent
Morris et al.

(10) Patent No.: US 7,364,189 B2
(45) Date of Patent: Apr. 29, 2008

(54) VOLUME-FILLING MECHANICAL STRUCTURES WITH MEANS FOR DEPLOYING SAME IN A BOLSTER SYSTEM

(75) Inventors: Steven E. Morris, Fair Haven, MI (US); Robert R. Kubiak, Macomb, MI (US); Lawrence C Maugh, Ann Arbor, MI (US); Brian Latouf, Rochester, MI (US); Scott David Thomas, Novi, MI (US); Peter J. Gareau, Warren, MI (US)

(73) Assignee: General Motors Corporation, Detroit, MI (US)

( * ) Notice: Subject to any disclaimer, the term of this patent is extended or adjusted under 35 U.S.C. 154(b) by 272 days.

(21) Appl. No.: 11/105,281

(22) Filed: Apr. 13, 2005

(65) Prior Publication Data
US 2006/0232051 A1 Oct. 19, 2006

(51) Int. Cl.
*B60R 21/04* (2006.01)
(52) U.S. Cl. .................... 280/732; 280/753; 280/743.2
(58) Field of Classification Search ................ 280/751, 280/748, 728.1, 732, 753, 743.2, 752; 296/187.02
See application file for complete search history.

(56) References Cited

U.S. PATENT DOCUMENTS

| | | | | |
|---|---|---|---|---|
| 3,198,543 | A * | 8/1965 | Presunka | 280/751 |
| 4,194,762 | A * | 3/1980 | Sudo | 280/751 |
| 4,978,136 | A * | 12/1990 | Tomita et al. | 280/751 |
| 5,536,043 | A * | 7/1996 | Lang et al. | 280/753 |
| 5,599,043 | A * | 2/1997 | Fujita et al. | 280/750 |
| 5,791,597 | A * | 8/1998 | Knoll | 244/121 |
| 5,836,547 | A * | 11/1998 | Koch et al. | 244/122 R |
| 5,839,756 | A * | 11/1998 | Schenck et al. | 280/743.1 |
| 6,340,170 | B1 * | 1/2002 | Davis et al. | 280/730.1 |
| 6,702,366 | B1 * | 3/2004 | Browne et al. | 296/187.02 |
| 6,742,830 | B2 * | 6/2004 | Zimmerman et al. | 296/146.7 |
| 6,793,246 | B2 * | 9/2004 | Horsch | 280/751 |
| 6,832,776 | B1 * | 12/2004 | Soderstrom | 280/730.1 |
| 6,857,659 | B2 * | 2/2005 | Webber | 280/743.2 |
| 6,877,795 | B2 * | 4/2005 | Browne et al. | 296/187.02 |
| 6,879,897 | B2 | 4/2005 | Johnson et al. | 701/45 |
| 7,040,658 | B2 * | 5/2006 | Kellas | 280/751 |
| 7,140,478 | B2 * | 11/2006 | Barvosa-Carter et al. | 188/267 |

(Continued)

OTHER PUBLICATIONS

U.S. Appl. No. 11/092,127, filed Mar. 29, 2005, "Methods for Modifying a Crash Deceleration Pulse".

(Continued)

*Primary Examiner*—Eric Culbreth
*Assistant Examiner*—Karen J. Amores

(57) ABSTRACT

A volume-filling mechanical structure for modifying a crash including: a bolster system defined by an outer bolster and an inner bolster; a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states; a means for deploying the honeycomb celled material from the dormant state to the deployed state causing the outer bolster to translate away from the inner bolster; and a tether operably connecting one end of the honeycomb celled material to the means for deploying the honeycomb celled material from the dormant state to the deployed state.

20 Claims, 12 Drawing Sheets

U.S. PATENT DOCUMENTS

| | | | |
|---|---|---|---|
| 2002/0046911 A1* | 4/2002 | Sacks et al. | 188/377 |
| 2004/0119271 A1* | 6/2004 | Webber | 280/731 |
| 2004/0140658 A1* | 7/2004 | Kellas | 280/751 |
| 2005/0116456 A1* | 6/2005 | Tajima et al. | 280/751 |
| 2005/0218696 A1* | 10/2005 | Aase et al. | 296/187.02 |
| 2006/0186701 A1* | 8/2006 | Browne et al. | 296/187.02 |
| 2006/0208473 A1* | 9/2006 | Morris et al. | 280/752 |
| 2006/0226637 A1* | 10/2006 | Ryan et al. | 280/728.1 |
| 2006/0232051 A1* | 10/2006 | Morris et al. | 280/732 |

OTHER PUBLICATIONS

U.S. Appl. No. 11/093,271, filed Mar. 29, 2005, "Volume-Filling Mechanical Assemblies and Methods of Operating the Same".

U.S. Appl. No. 11/093,272, filed Mar. 29, 2005, "Force and Deceleration Delimiting Devices and Method for Operating the Same".

* cited by examiner

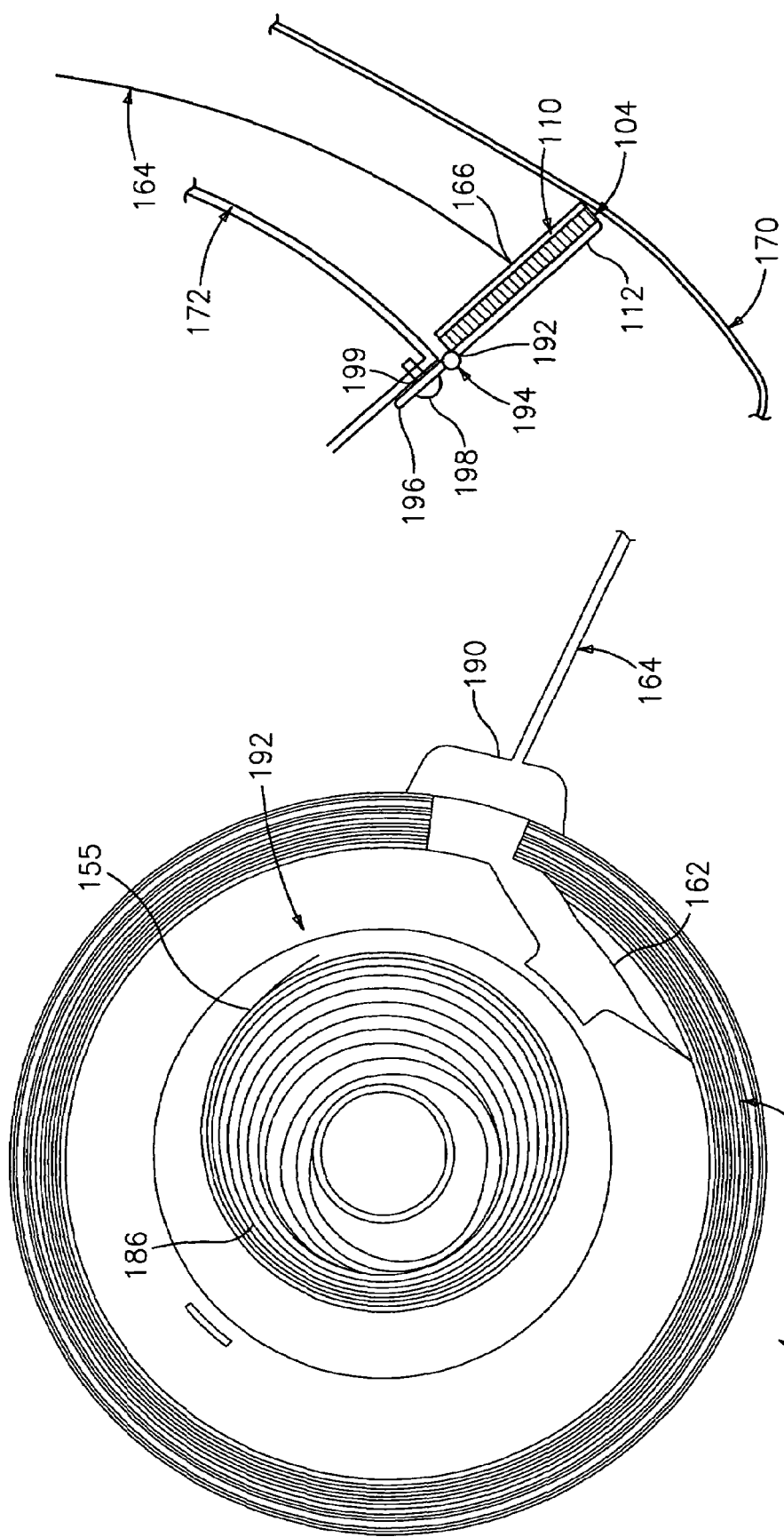

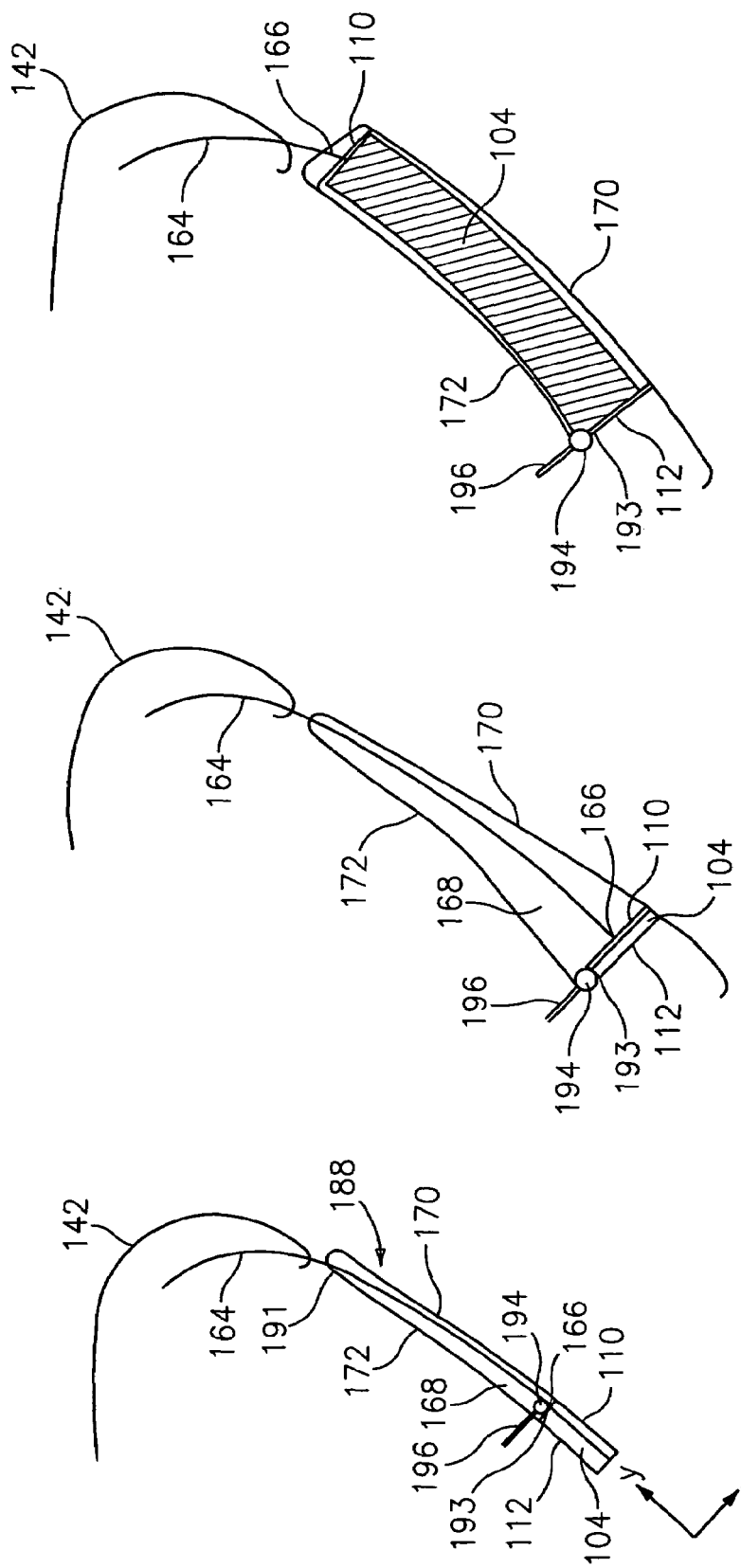

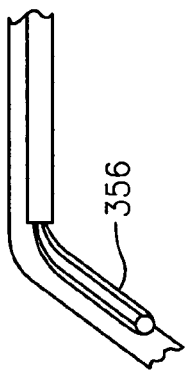
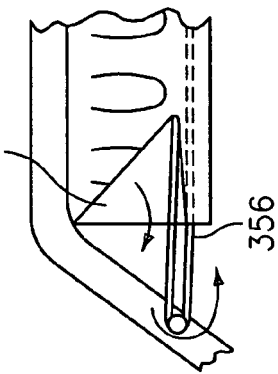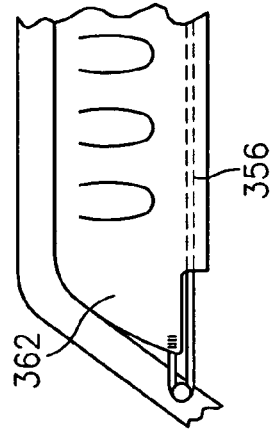
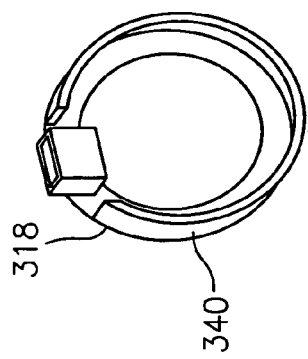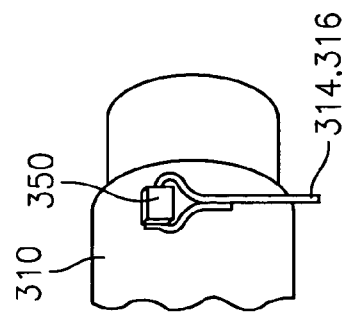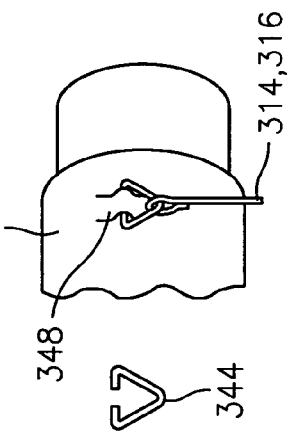
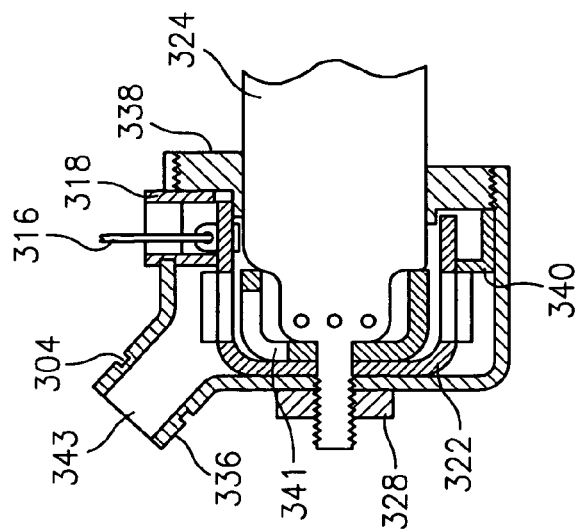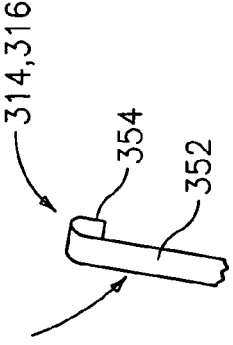

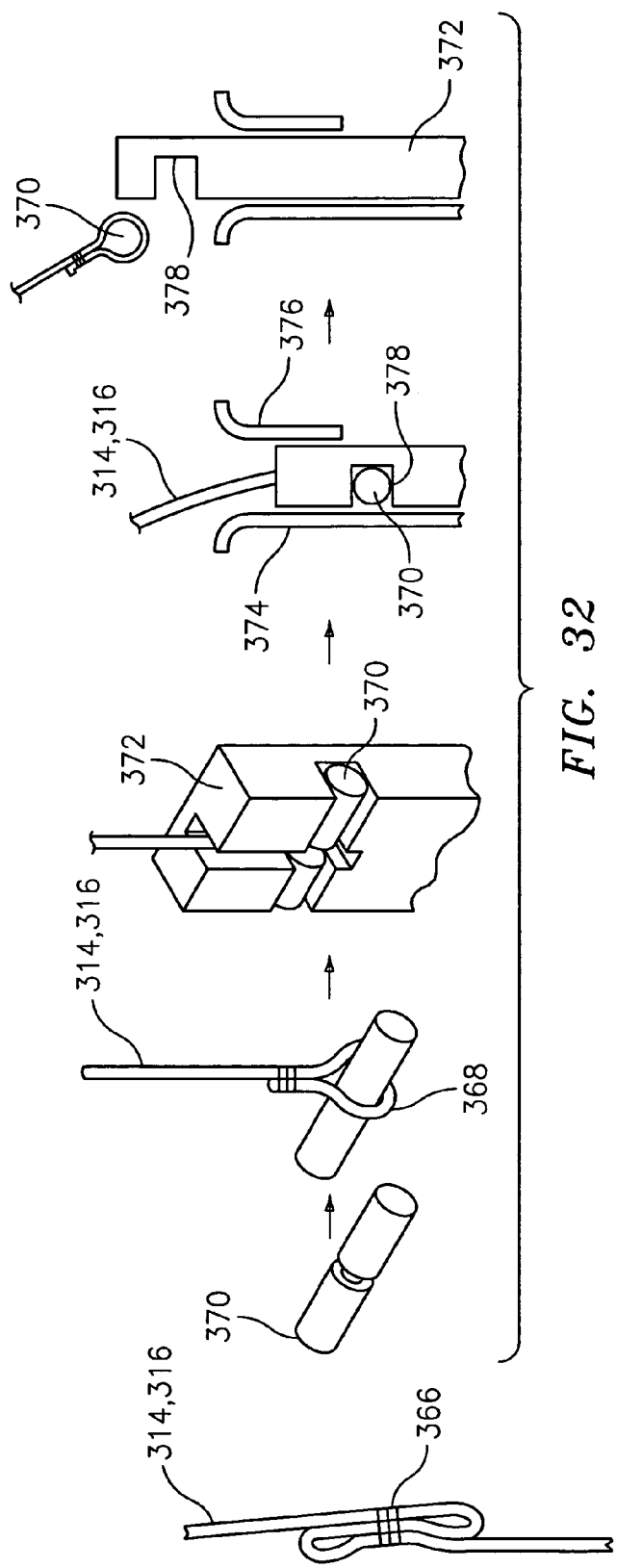
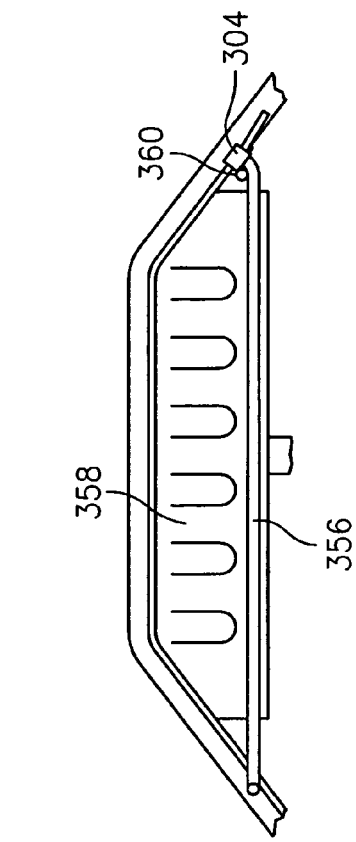
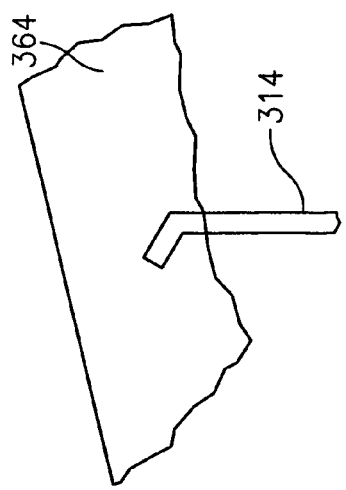
FIG. 32
FIG. 26
FIG. 30
FIG. 31

VOLUME-FILLING MECHANICAL STRUCTURES WITH MEANS FOR DEPLOYING SAME IN A BOLSTER SYSTEM

TECHNICAL FIELD

The present invention relates to structures used for crash protection and/or crash energy management at around the time of a vehicle crash, and more particularly to means for deploying mechanical structures, which are volumetrically reconfigurable such as to occupy a small volume when in a dormant state and then rapidly expand to a larger volume in a deployed state when needed for providing crash protection and/or crash energy management.

BACKGROUND OF THE INVENTION

A vehicle, in addition to the inherent crush characteristics of its structure, may have dedicated crash energy management structures. Their function is exclusively to dissipate energy in the event of a crash. Such dedicated structures have predetermined crush characteristics which contribute to the resulting deceleration pulse to which the occupants are subjected.

In the vehicular arts there are two known types of such dedicated crash energy management structures: those which are passive, and those which are active.

An example of a passive dedicated crash energy management structure is an expanded honeycomb celled material, which has been used to a limited degree in certain vehicles. FIG. 1 exemplifies the process of fabrication of a honeycomb-celled material. A roll 10 of sheet material having a preselected width W is cut to provide a number of substrate sheets 12, each sheet having a number of closely spaced adhesive strips 14. The sheets 12 are stacked and the adhesive cured to thereby form a block, referred to as a HOBE® (registered trademark of Hexcel Corporation) block 16 having a thickness T. The HOBE block is then cut into appropriate lengths L to thereby provide HOBE bricks 18. The HOBE brick is then expanded by the upper and lower faces 20, 22 thereof being separated away from each other, where during the adhesive strips serve as nodes whereat touching sheets are attached to each other. A fully expanded HOBE brick is composed of a honeycomb celled material 24 having clearly apparent hexagonal cells 26. The ratio of the original thickness T to the expanded thickness T' is between 1 to 20 to 1 to 60. An expanded honeycomb celled material provides crash energy management parallel to the cellular axis at the expense of vehicular space that is permanently occupied by this dedicated energy management structure.

Typically, crash energy management structures have a static configuration in which their starting volume is their fixed, operative volume, i.e. they dissipate energy and modify the timing characteristics of the deceleration pulse by being compressed (i.e., crushing or stroking of a piston in a cylinder) from a larger to a smaller volume. Since these passive crash energy management structures occupy a maximum volume in the uncrushed/unstroked, initial state, they inherently occupy vehicular space that must be dedicated for crash energy management—the contraction space being otherwise unstable. Expressed another way, passive crash energy management structures use valuable vehicular space equal to their initial volume which is dedicated exclusively to crash energy management throughout the life of the vehicle even though a crash may never occur, or may occur but once during that time span. This occupied contraction space is not available for other uses, including functions such as enabling a more spacious vehicle interior and styling flexibility.

The fixed fore-aft location of a knee bolster may constrain how far the lower portion of the instrument panel can be placed forward and away from the knees of an occupant. This constraint can limit comfort for the occupant. The position of current fixed-in place knee bolster systems is also a constraint on interior spaciousness. It is known that utilization of inflatable knee bolster systems brings the location of the lower portion of the instrument panel rearward when preferred. However, such crash triggered inflatable knee bolster systems do not typically retract automatically, and could require complete replacement after actuation. Such replacement is expensive, a cost borne by the consumer.

Active crash energy management structures have a predetermined size which expands at the time of a crash so as to increase their contribution to crash energy management.

One type of dedicated active crash energy management structure is a stroking device, basically in the form of a piston and cylinder arrangement. Stroking devices have low forces in extension and significantly higher forces in compression (such as an extendable/retractable bumper system) which is, for example, installed at either the fore or aft end of the vehicle and oriented in the anticipated direction of crash induced crush. The rods of such devices would be extended to span the previously empty spaces upon the detection of an imminent crash or an occurring crash (if located ahead of the crush front). This extension could be triggered alternatively by signals from a pre-crash warning system or from crash sensors or be a mechanical response to the crash itself. An example would be a forward extension of the rod due to its inertia under a high G crash pulse. Downsides of such an approach include high mass and limited expansion ratio (1 to 2 rather than the 1 to 20 to 1 to 60 possible with a compressed honeycomb celled material).

Another type of active dedicated crash energy management structure includes inflatable airbags or pyrotechnic air cans. Downsides of such systems, in addition to those discussed above, include low force levels and low ratios of crush force to added mass due to the lack of mechanical rigidity of these systems.

Accordingly, what remains needed in the vehicular arts is a dedicated vehicular crash energy management structure which provides at times other than a crash event open spaces for other uses than crash pulse management, a high level of compression ratio, high crush force, and a low crush force to mass ratio.

Examples of some such active and passive devices are detailed in U.S. Pat. No. 6,702,366 the contents of which are incorporated by reference herein. U.S. Pat. No. 6,702,366 provides for both active and passive crash energy management structures. Specifically, U.S. Pat. No. 6,702,366 describes the use of a honeycomb celled material, such as that described above that expands from a dormant state to a deployed state at around the time of a crash. U.S. Pat. No. 6,702,366 does not provide for specific deployment means of the honeycomb celled material.

Occupant protection devices and crash energy management devices have not been provided with deployment means due to most of such devices being of a selected size and placement which merely deform to absorb crash energy or protect vehicle occupants or pedestrians. As such there has been little development of deployment means for such devices.

Accordingly, what remains needed in the vehicular arts are means for deploying a volume-filling mechanical structure with respect to a bolster system, which causes deployment of the volume-filling mechanical structure from a dormant state to a deployed state at around the time of a crash event.

SUMMARY OF THE INVENTION

In one embodiment herein there is provided a volume-filling mechanical structure for modifying a crash including: a bolster system defined by an outer bolster and an inner bolster; a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states; a means for deploying the honeycomb celled material from the dormant state to the deployed state causing the outer bolster to translate away from the inner bolster; and a tether operably connecting one end of the honeycomb celled material to the means for deploying the honeycomb celled material from the dormant state to the deployed state.

In another embodiment herein there is also provided a system to harness energy from deployment of an airbag to power a vehicle device including: an airbag module; an airbag disposed at the airbag module; an airbag inflator disposed at the airbag module, the airbag inflator in operable communication with the airbag to inflate the same; a spool rotatably disposed around the airbag inflator; and a tether having a first end and a second end, at least a portion of the first end of the tether is wrapped on the spool rotatable by deployment of the airbag and a second end in communication with the vehicle device; wherein the spool is receptive to rotation when loaded by impinging inflator gases from the airbag inflator to wind up the tether used to power the vehicle device.

In yet another embodiment herein there is provided a method attenuating a vehicle crash energy impact. The method includes attaching a volume-filling mechanical structure to a bolster system defined by an outer bolster and an inner bolster of a vehicle, wherein the volume-filling mechanical structure includes a honeycomb celled material expandable from a dormant state to a deployed state. The honeycomb celled material is disposed intermediate the outer and inner bolsters cooperatively positioned with the honeycomb celled material to cover surfaces defining the honeycomb celled material in the deployed and dormant states. The volume-filling mechanical structure further includes a means for deploying the volume-filling mechanical structure from the dormant state to the deployed state. A tether operably connects one end of the honeycomb celled material to the means for deploying the volume-filling mechanical structure from the dormant state to the deployed state and the honeycomb celled material expands via the means for deploying at about an energy impact to the vehicle causing the outer bolster to translate away from the inner bolster, and wherein the honeycomb celled material absorbs kinetic energy from the energy impact.

In yet another embodiment herein there is provided a motor vehicle equipped with a crash energy management structure, comprising a bolster system; a crash energy management structure connected to the bolster system, the crash energy management structure comprising a volume-filling mechanical structure connected to the bolster system, the volume-filling mechanical structure being expandable from a first volume to a second volume, wherein the second volume is larger than the first volume; an exposed bolster surface cooperatively positioned with the mechanical structure to selectively cover a surface of the first and second volumes, wherein the exposed bolster surface has a dormant state for the first volume and a deployed state for the second volume; a means for deploying expansion of the mechanical structure from the first volume to the second volume, and for regulating a transition from the dormant state to the deployed state of the exposed bolster surface; and a tether operably connecting one end of the honeycomb celled material to the means for deploying expansion of the honeycomb celled material from the first volume to the second volume.

The embodiments noted above provide for a mechanical, active dedicated crash energy management structure for providing crash protection and/or crash energy management, wherein the structure has a dormant (initial) state volume, but then in the event of a crash, utilizes various means of deployment that timely expand into a much larger deployed volume for providing management of energy of an expectant crash.

The active dedicated crash energy management structure according to the present invention directly addresses the space robbing deficiency of prior art crash energy management structures. It does this specifically by having a small dormant volume (during normal driving conditions) which allows empty space adjacent thereto for enabling a more spacious vehicle interior and styling flexibility, and only assumes a larger deployed volume just prior to, or in response to, a crash.

The principle embodiment of the crash energy management structure according to the present invention is a before expansion honeycomb celled material brick (honeycomb brick) such as for example manufactured by Hexcel Corp. of Pleasanton, Calif., wherein expansion of the honeycomb brick is in a plane transverse to the cellular axis of the cells thereof, and crash crush is intended to be parallel to the cellular axis.

The honeycomb brick occupies anywhere from approximately $1/20$th to $1/60$th of the volume that it assumes when in it is fully deployed (the expansion ratio) into a deployed honeycomb celled material (deployed honeycomb), depending on the original cell dimensions and wall thickness. Honeycomb cell geometries with smaller values of the expansion ratio in general deliver larger crush forces, and the choice of the honeycomb celled material is dependent upon the crush force (stiffness) desired in a particular crash energy management application (i.e., softer or harder metals or composites). Deployed honeycomb celled material has excellent crash energy management capabilities, but only parallel to the cellular axis, as discussed hereinabove.

According to one embodiment herein, various devices provide for means of deploying a volume-filling mechanical structure, such as an expandable honeycomb brick located within a panel, such as exist for example in the instrument panel including the glove box panel or steering column filler. The honeycomb brick is placed so that the common cellular axis of its cells is oriented parallel to an envisioned crash axis, i.e., the direction of impact for which it is intended to serve as an energy absorber. A rigid end cap is attached, respectively, to each of the mutually opposed upper and lower end faces of the honeycomb brick (the ends which are perpendicular to the transverse plane and parallel to the crash axis).

In the event of a crash, either an active or passive deployment means is provided for moving the end caps away from each other so that the honeycomb brick expands in the transverse plane into the previously unoccupied transversely adjacent space. For example, movement of the end caps may be triggered by a pyrotechnic explosion, air pressure, a pneumatic spring, a tensioning of a flexible cable, a solenoid, an active material and the like. Upon expansion, this previously unoccupied space will now function efficiently for crash energy management.

Various embodiments are proposed which allow for returning the honeycomb celled material from the deployed state to the dormant state in the event a serious crash does not occur. While various automatic means can be envisioned, one embodiment would involve a manual reset, for example by a trained mechanic at a dealership. For example, the mechanic would compress the honeycomb celled material back to the dormant state, compress an expansion agency (i.e., a spring) and reset a catch of the deployment means holding the honeycomb celled material in the dormant state ready for expansion in the event of a forthcoming crash.

Accordingly, it is one embodiment herein to provide a dedicated crash energy management structure, comprising a volume-filling structure with deployment means for deploying the volume-filling structure from a small dormant state volume which in the event of a crash, timely expands into a much larger deployed volume for providing management of an expectant crash pulse.

This and additional features and advantages will become clearer from the following specification.

BRIEF DESCRIPTION OF THE DRAWINGS

FIG. 10 is a cross section view of a coil spring mechanism depicting the biasing member as a coil spring operably connected to the tether in an alternative exemplary embodiment.

FIG. 11 is a cross section view of separable inner and outer bolsters having the crash energy management device disposed therebetween in accordance with an alternative exemplary embodiment.

FIGS. 12-14 is a progression of deployment of the crash energy management device of FIG. 11 illustrating pivoting movement thereof and expansion thereof.

FIG. 21 is a cross section view of an airbag module used for applications where the inflator pipes gas into a cushion including a roof rail air bag, for example, in accordance with alternative exemplary embodiment.

FIG. 22 is a perspective view of a plug in FIG. 21 through which the tether routes through.

FIG. 23 is a partial perspective view of the spool and inflator illustrating attachment of tether to the spool.

FIG. 24 is a partial perspective view of another spool and inflator illustrating attachment of tether to the spool in accordance with an alternative embodiment.

FIG. 25 is a perspective view of the tether configured as a metal strap.

FIG. 26 is schematic a lower tether routed in a roof rail air bag, where the lower tether may be tightened using the approach described above with reference to FIGS. 17-25.

FIGS. 27-29 is a deployment progression illustrating the lower tether attached to and used to position a flap in a roof rail air bag application as it is pulled tight during deployment of the inflator.

FIG. 30 is a schematic of the tether attached to a portion of an airbag cushion that is pulled during deployment, in accordance with another exemplary embodiment.

FIG. 31 is a side view of the tether having tear stitching as an energy-absorption feature upon completion of deployment.

FIG. 32 illustrates a sequential assembly and operation of an alternative exemplary embodiment of a release mechanism for the tether upon completion of deployment.

DESCRIPTION OF THE PREFERRED EMBODIMENT

Figure 1:
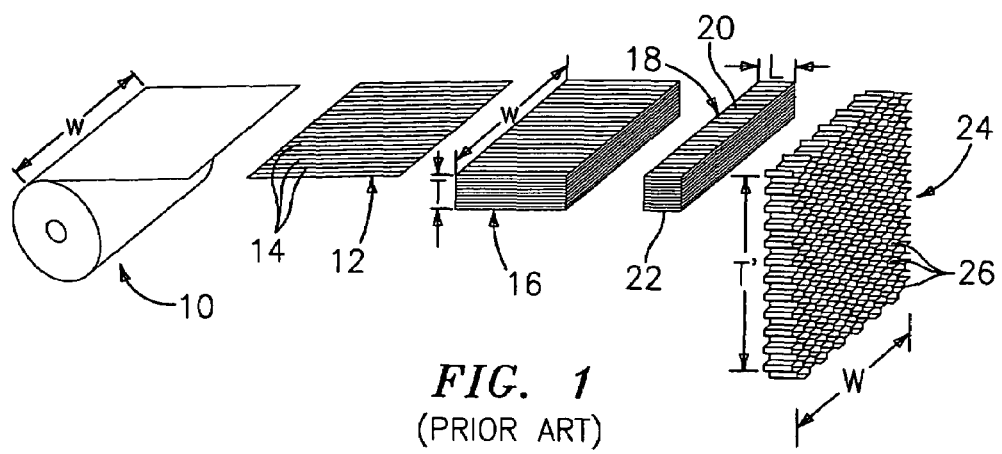
FIG. 1 is a series of perspective views of a manufacturing process to provide a prior art honeycomb celled material.

The present disclosure provides a crash energy management structure that comprises an expandable volume-filling mechanical structure for containing and cushioning occupants within the vehicle in impacts with both interior and exterior objects, wherein the volume-filling mechanical structure has means for, in the event of a crash, timely expanding into a deployed volume for providing energy absorption of an expectant crash. At around the time of a crash event in or around a vehicle and/or about energy impact is when the means for deploying the volume-filling structure may be actuated. The current disclosure employs the volume-filling mechanical structures such as honeycomb celled material 104 with a knee bolster for a driver or passenger within the vehicle. Such employment allows variation of current knee bolster design guidelines while providing for easy deployment of honeycomb celled material 104 from a dormant state to a deployed state without significant expense or complexity.

Referring now to the Drawings, FIGS. 2 through 34 depict preferred embodiments of an active dedicated crash energy management structure 100 according to the present invention.

Figure 2:
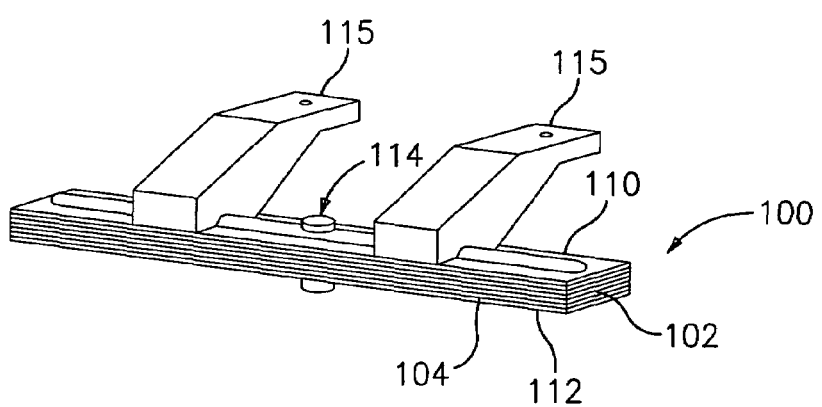
FIG. 2 is a perspective view of a crash energy management device according to the present invention, shown in a before expanded (dormant) state.
Figure 3:
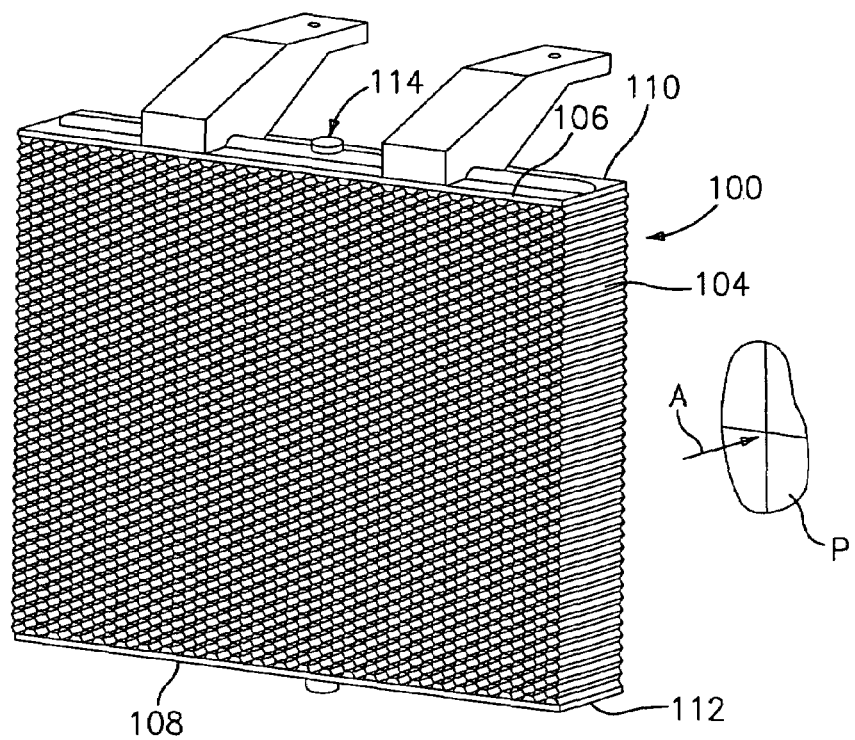
FIG. 3 is a perspective view of the crash energy management device of FIG. 2, shown in an expanded (deployed) state.

A honeycomb brick 102 composed of a honeycomb celled material 104 is provided, as for example according to a method of manufacture utilized to provide HOBE® bricks, as discussed hereinabove. The honeycomb brick 102 is not expanded such that it is at its most compacted state. Attached (such as for example by an adhesive) to the upper and lower faces 106, 108 of the honeycomb brick 102 are respective end caps 110, 112. The end caps 110, 112 are rigid and serve as guide members for defining the configuration of the honeycombed cell material 104 between a dormant state as shown at FIG. 2 and a deployed state as shown at FIG. 3.

The end caps 110, 112 need not necessarily be planar. Indeed, they do not need to have the same shape or size, but for a minimum unexpanded volume the end caps should have the same size and shape. For example, if deployed at a knee bolster area, the end caps may have a slightly curved shape generally matching the curve of the knee bolster area corresponding with a lower portion of the instrument panel extending along a width defining the vehicle. For another example, for expansion into a narrowing wedge shaped space, the end cap which moves as the honeycomb celled material expands may be shorter than the stationary end cap, so that the expanded honeycomb celled material has a complimentary wedge shape.

An activation mechanism 114 is connected to the end caps 110, 112. The activation mechanism 114 controls the state of the honeycomb-celled material in that when activated, a rapid expansion from the dormant state to the deployed state occurs. One or more installation brackets 115 may be connected to one of the end caps 110, 112 so that the crash management structure 100 is connectable to a selected component of a motor vehicle. Alternatively, one of the end caps 110, 112 may be fixedly secured directly to a selected component of the motor vehicle without any installation brackets, as discussed more fully herein.

Figure 4:
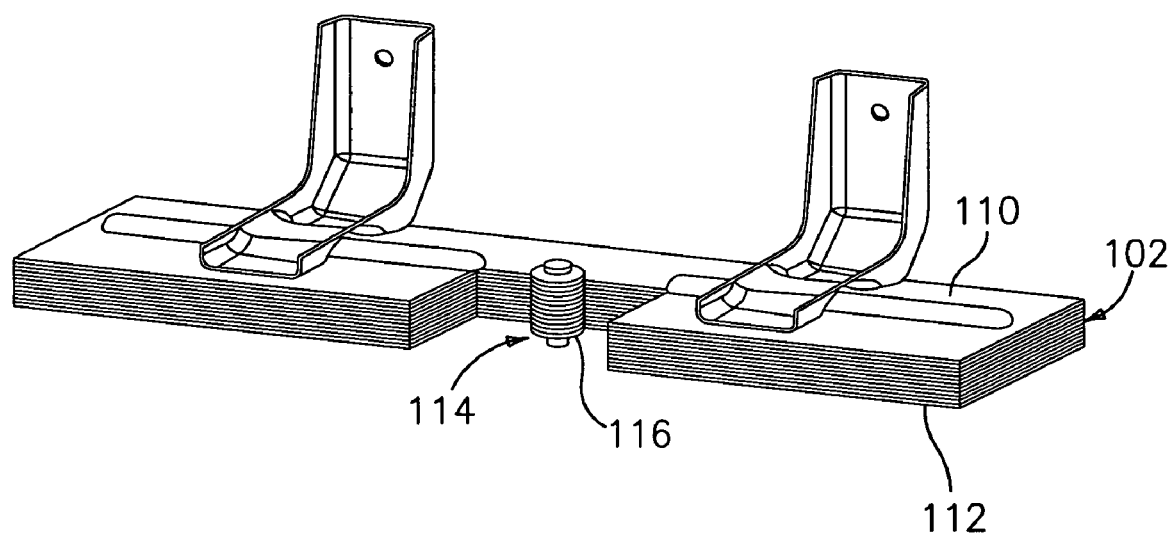
FIG. 4 is a perspective, cut-away view of a crash energy management device according to the present invention, showing an example of an active activation system.
Figure 5:
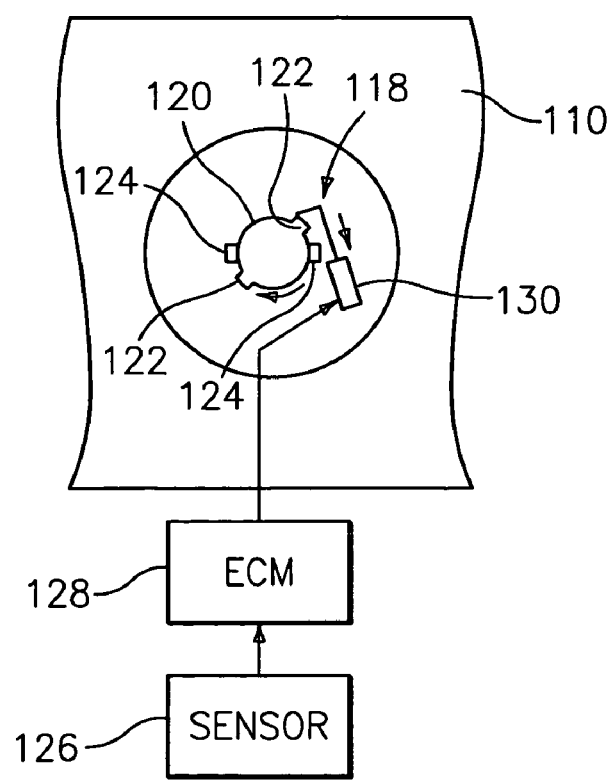
FIG. 5 is a broken-away, top plan view, showing a trigger of the activation system of FIG. 4.

An example of an activation mechanism 114 is shown at FIGS. 4 and 5. An expansion agency in the form of a highly compressed spring 116 is situated abuttingly between the end caps 110, 112. The spring 116 is held highly compressed selectively by a trigger 118. The trigger 118 includes a disk 120 which is rotatably mounted to an end cap 110, wherein the disk has a pair of opposed fingers 122 which are receivable by a pair of opposed slots 124 formed in the end cap. In an active form, the activation mechanism 114 is triggered by a signal from a crash sensor 126 which signal is interpreted by an electronic control module 128, which in response sends an activation signal to a solenoid 130. The activation signal causes a rotation of the disk 120 so as to cause the fingers 122 to fall into the slots 124 and thereupon the spring to rapidly decompress resulting in the honeycombed cell material to rapidly expand from the dormant state of FIG. 2 to the deployed state of FIG. 3. Other expansion agencies besides a compressed spring may include a pyrotechnic device or a pressurized air cylinder. Alternatively, the activation mechanism may be passive and mechanically triggered by a crash due to crash induced movement of vehicle components.

Figure 6:
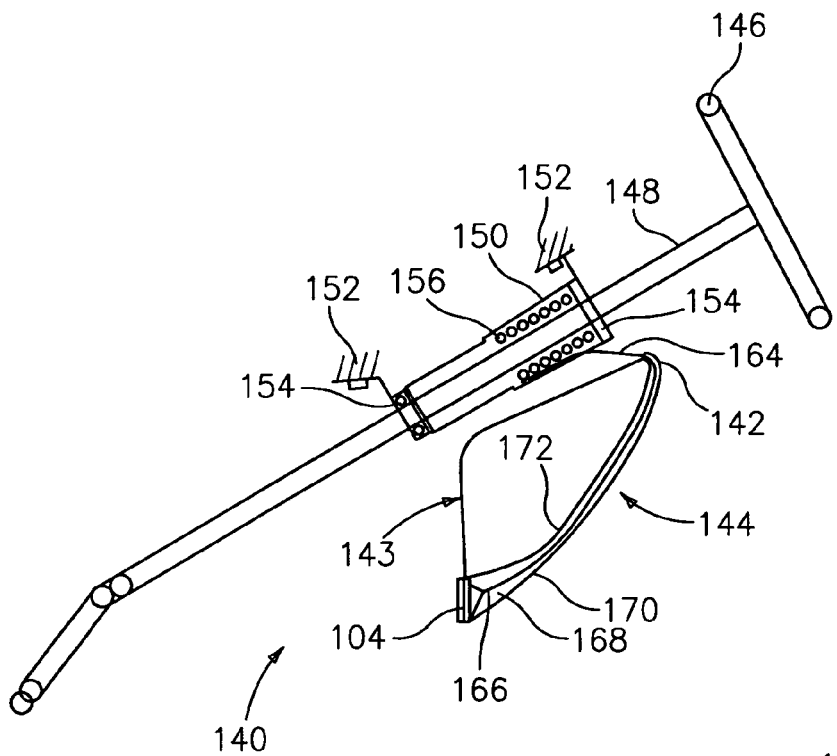
FIG. 6 is a schematic cross section view of a steering column assembly in conjunction with a portion of an instrument panel showing a biasing member in communication with crash energy management device via a tether in accordance with an exemplary embodiment.

FIGS. 6 though 15 show illustrative examples of knee bolster compartment placements 140 of the active dedicated crash energy management structure 100. Placements 140 may also, for example, be located at a glove box door for a passenger (FIGS. 11-15) or located between the instrument panel retainer 342 and the steering column filler 144 for a driver (FIGS. 6 and 7).

Figure 7:
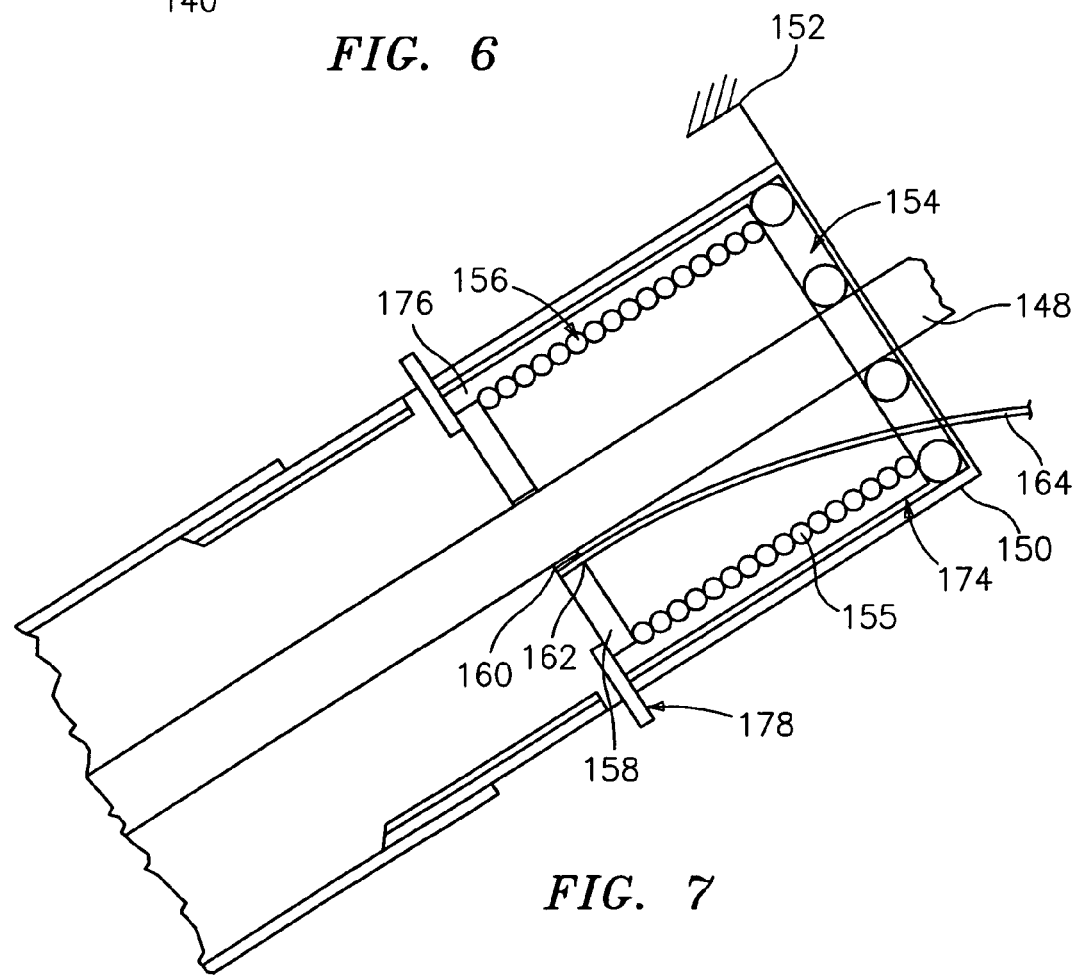
FIG. 7 is an enlarged cross section view of the biasing member of FIG. 6, showing a compression spring disposed around a steering column.

Referring now to FIGS. 6 and 7, placement 140 includes a steering column assembly illustrated in conjunction with a portion of an instrument panel 142 extending from a retainer 143 corresponding with a lower steering column shroud area or steering column filler 144. The steering column assembly 140 includes a hand wheel 146 operably coupled to a steering column 148. A housing 150 is fixedly secured relative to steering column 148 indicated generally at 152. Bearings 154 are disposed at either end defining housing 150 rotatably supporting steering column 148.

A biasing member 155 is disposed in housing 150. In an exemplary embodiment, biasing member includes a compression spring 156 compressed against bearing 154 proximate hand wheel 146 via a disk 158 slidably disposed in housing 150. Disk 158 includes an aperture 160 aligned with steering column 148 allowing steering column 148 therethrough. Disc 148 further includes one end 162 of a tether 164 operably coupled thereto and extending therefrom. An opposite end 166 of tether 164 is operably coupled to first rigid end cap 110, which in turn is coupled to honeycomb celled material 104. The honeycomb celled material is disposed in a dormant state in a space 168 defined between an outer bolster 170 and an inner bolster 172 defining the steering column filler panel 144.

The deployment mechanism for expanding the honeycomb celled material in an exemplary embodiment and still referring to FIGS. 6 and 7, includes a sensing system (not shown) for a drivers side air bag (not shown) to actuate the drivers side lower energy management system. The system uses tether 164 to attach the expandable honeycomb material 104 to compression spring 156 mounted around steering column 148 within housing 150. A sleeve 174 is disposed between spring 156 and housing 150 to facilitate translation of a movable end 176 of spring 156 within housing 150. In an exemplary embodiment, sleeve 174 is a nylon sleeve. When the vehicle detects a collision, a solenoid 178 or other mechanism releases spring 156. The energy stored in spring 156 expands the metallic honeycomb material 104 via tether 164. In an exemplary embodiment, aluminum honeycomb material 104 is used, which expands to 60 times its original thickness and can be deployed with ⅒ the energy the material manages when deployed.

The expandable honeycomb celled material 104 can be mounted in the lower or upper portion of the steering column filler 144 and tether 164 can either pull up or down. As such, the deployment mechanism described above is suitable for use in deployment of an energy management system for the lower steering column shroud area. An energy management deployment system as described can be easily carried from one vehicle design to another with minimal work. Furthermore, such a system requires less packaging space than a design with a separate deployment system.

Figure 8:
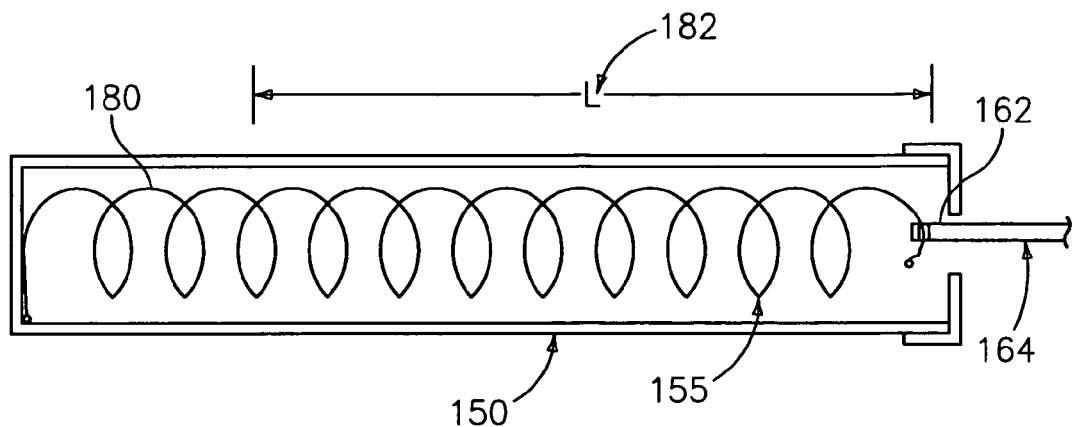
FIG. 8 is a schematic cross section view of a tension spring used as a biasing member, showing the tension spring in the dormant state in an alternative exemplary embodiment.
Figure 9:
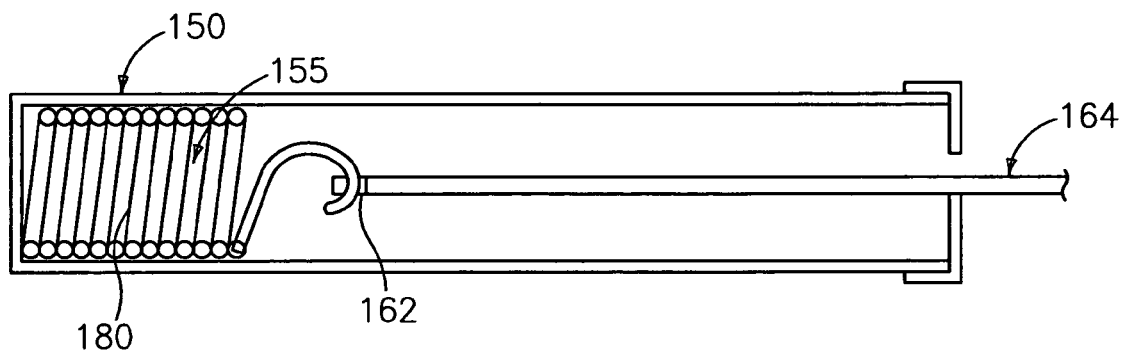
FIG. 9 is a schematic cross section view of FIG. 8, showing the tension spring in the deployed state.

Referring now to FIGS. 8 and 9, biasing member 155 includes a tension spring 180. This deployment mechanism is a tension spring system that includes tension spring 180 pulled to store the energy needed to deploy an expandable aluminum honeycomb bolster system. Tension spring 180 is housed in a cylinder housing 150, similar to the housing 150 used with compression spring 156 in FIGS. 6 and 7. Cylinder housing 150 for tension spring 180 has a length substantially equal to a length of the spring free length (see FIG. 9) and a length (L) of the desired bolster protection indicated generally at 182. The system uses tether 164 attached to tension spring 180 at end 162 and an opposite end 166 operably coupled to the unexpanded aluminum honeycomb celled material 104. When the crash sensor 126 senses a collision a solenoid (not shown) releases tension spring 180. The released spring pulls in tether 164 forcing the aluminum honeycomb material to expand as described above.

Referring now to FIG. 10, a coil spring mechanism 184 is illustrated depicting biasing member 155 as a coil spring 186 in an alternative exemplary embodiment. Coil spring mechanism includes a housing 250 having an opening 190 receptive to tether 164 extending therethrough. A spool 192 is rotatably disposed within housing 250. One end 162 of tether 164 is coiled around spool 192 while an opposite end thereof is operably coupled to first rigid end cap 110, which in turn is coupled to honeycomb celled material 104, with reference to FIG. 6. Coil spring 186 is operably connected to spool 192, both of which are disposed within housing 250. Coil spring 186 is receptive to storing energy to deploy the honeycomb celled material 104 by coiling tether 164 proximate end 162 around spool 192.

In an exemplary embodiment, coil spring 186 is wound to store the energy needed to deploy an expandable aluminum honeycomb bolster system. The system uses tether 164 attached to coil spring 186 at end 162 and the opposite end 166 attached the unexpanded aluminum honeycomb material 104 (e.g., dormant state). When the crash sensor or sensing and diagnostic module (SDM) senses a collision, a solenoid (not shown), but similar to solenoids 130, 170, releases the spring mechanism. The released spring 186 reels in tether 164 forcing the aluminum honeycomb material to expand within the bolster system similar to that as described with reference to FIG. 6.

Referring now to FIGS. 11-14, another alternative exemplary embodiment of a deployment mechanism for honeycomb celled material 104 is illustrated. In particular, instrument panel 142 is shown in conjunction with a glove box panel door 188 defined by outer bolster 170 and inner bolster 172. Inner and outer bolsters are separable indicated generally at 191 in FIG. 12. Honeycomb celled material 104 is disposed in a dormant state (FIG. 12) in a space 168 defined between outer bolster 170 and inner bolster 172 defining the glove box panel door 188. Opposite end 166 of tether 164 is operably coupled to first rigid end cap 110, which in turn is coupled to honeycomb celled material 104.

One end 193 of the second rigid end cap 112 opposite the first rigid end cap 110 having material 104 therebetween is pivotally engaged with inner bolster 172 generally indicated at 194. In an exemplary embodiment as illustrated, pivot 194 includes a hinge 194. Hinge 194 is anchored to inner bolster 172 via a plate 196 pivotally extending therefrom. Plate 196 is fastened to inner bolster 172 using a mechanical fastener, such as a threaded bolt 198 extending through an aperture 199 in plate 196 and threadably received in inner bolster 172 as best seen in FIG. 11.

The first and second rigid end caps 110, 112, respectively are disposed substantially parallel to surfaces defining the inner and outer bolsters 172, 170, respectively, in a first plane corresponding to an Y-axis as in FIG. 12. End 166 of tether 164 is operably coupled to the first rigid end cap 110 and is receptive to pivoting end caps 110 and 112 about hinge 194 pulling the honeycomb celled material 104 into a second plane substantially transverse to the first plane allowing the honeycomb celled material to expand as best seen in FIG. 14. The second plane corresponds to an X-axis substantially normal to the Y-axis illustrated in FIG. 12. The expansion of the honeycomb celled material 104 (FIG. 14) prevents further pivoting of the second rigid end cap 112 about hinge 194 as the honeycomb celled material 104 is allowed to expand in space 168 intermediate the inner and outer bolsters 172, 170, respectively.

In the above described manner, the unexpanded honeycomb celled material 104 is packaged in the instrument panel such that end caps 110 and 112 are substantially parallel to a show surface (e.g., exposed surface of instrument panel or panel door within occupant compartment of vehicle). Disposing the honeycomb celled material parallel to the show surface enables better packaging and a more spacious vehicle interior.

Figure 15:
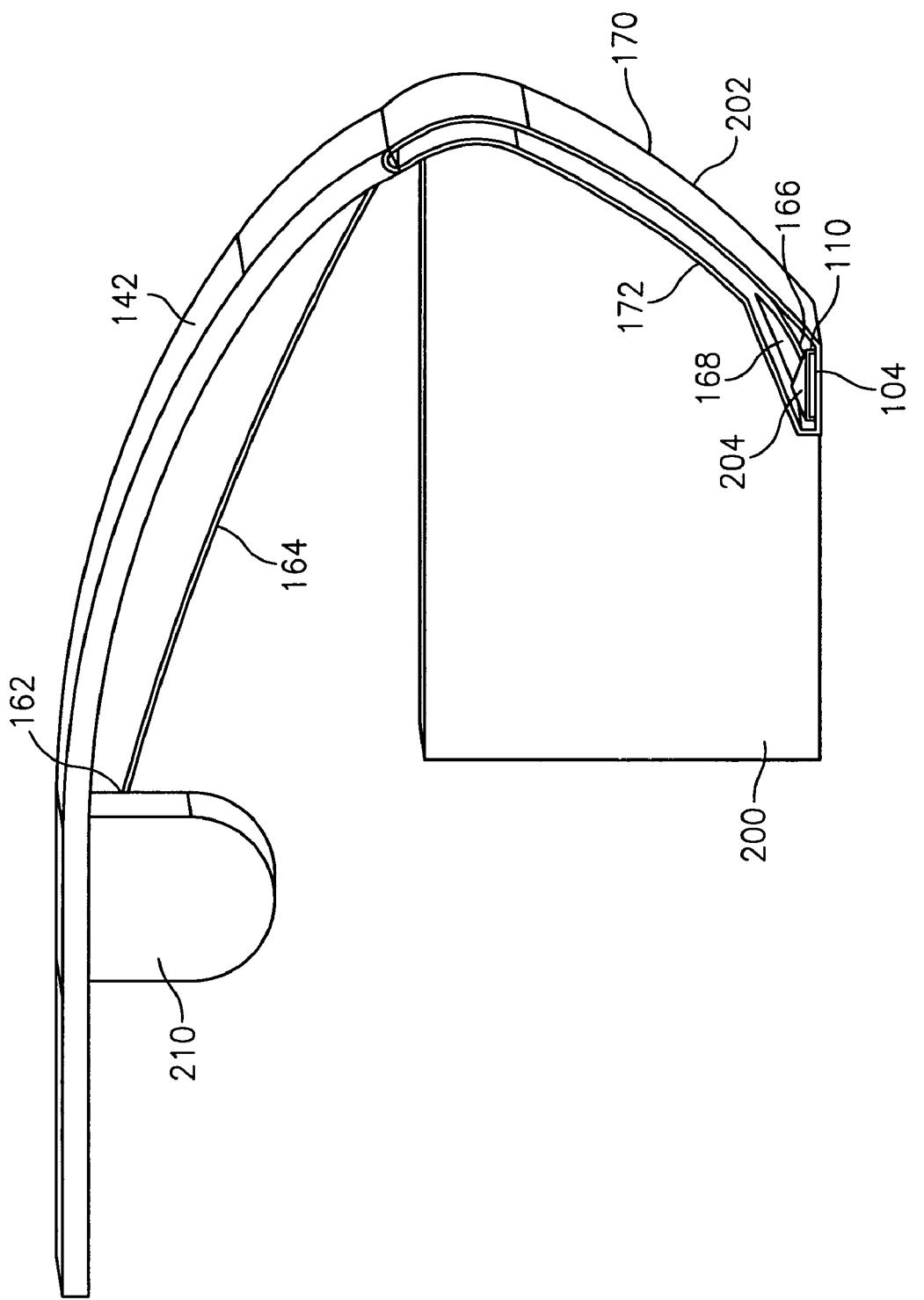
FIG. 15 is a cross section view of the honeycomb celled material disposed in a glove box door in an unexpanded form and operably connected via the tether to a passenger side inflatable restraint system.

FIG. 15 illustrates another exemplary embodiment of a deployment mechanism for expanding the honeycomb celled material 104 for a knee bolster system. More specifically, a glove box 200 having a glove box door 202 substantially flush with the instrument panel 142 is illustrated. Glove box door 202 includes inner bolster 172 and outer bolster 170 with honeycomb celled material 104 disposed therebetween. As described with reference to FIGS. 6 and 11-14, honeycomb celled material 104 includes end caps 110 and 112 fixed at opposing ends thereof.

End cap 110 is receptive to coupling with end 166 of tether 164 to aid in deployment or extend honeycomb celled material 104 into a deployed state. In an exemplary embodiment as illustrated, end cap 110 is a plastic upper carrier to aid in deployment of material 104.

End cap 110 as illustrated includes a wedge 204 extending from opposing ends defining end cap 110 (only one shown). Each wedge 204 is defined by a pointed portion extending in a void 168 defined between inner and outer bolsters 172, 170, respectively, where honeycomb celled material 104 is absent and in the dormant state. Although wedge 204 is described to be disposed at opposing ends of cap 110, it is contemplated that wedge 204 may extend an entire length thereof or along any portion defining a length cap 110. In this manner, wedge 204 facilitates expansion of outer bolster 170 from inner bolster 172 when honeycomb celled material 104 is activated to be deployed and extend to fill void 168 between inner and outer bolsters 172 and 170. Wedge 204 thus guides and facilitates expansion of honeycomb celled material 104.

An opposite end of tether 164 is operably connected to a passenger side inflatable restraint (PSIR) system 210, such as a passenger side inflatable airbag (not shown). End 162 of tether 164 is attached to the passengers side airbag such that when the air bag is deployed, tether 164 is pulled forcing the expanding honeycomb celled material 104 to expand the glove box door and fill the space 168 between the glove box door defined by inner and outer bolsters 172, 170, respectively.

The expandable honeycomb material is aluminum in an exemplary embodiment and can be mounted in the lower or upper portion of the glove box door and the tether can either pull up or down. When the pull direction is up as illustrated in FIG. 15, it will be recognized that a coupling (not shown) is needed to permit the glove box door to open.

The above described deployment mechanism requires less packaging space than a design with a dedicated deployment system for the expandable honeycomb celled material. Furthermore, use of the PSIR to deploy the honeycomb celled material reduces cost and mass compared to a system with a dedicated deployment mechanism.

Figure 16:
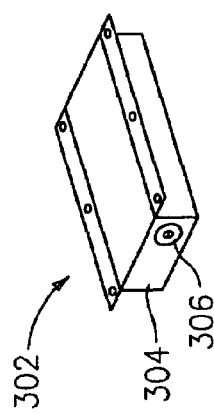
FIG. 16 is a perspective view of an airbag module housing having an inflator for use as a deployment means of the honeycomb celled material.

In another exemplary embodiment referring to FIGS. 16-29, another deployment mechanism harnessing energy from a PSIR system is described. FIG. 16 illustrates an airbag module 302. The air bag module 302 includes a housing 304, an inflator 306, and a cushion or inflatable airbag (not shown) that is attached to housing 304 using numerous existing methods known in the art.

Figure 17:
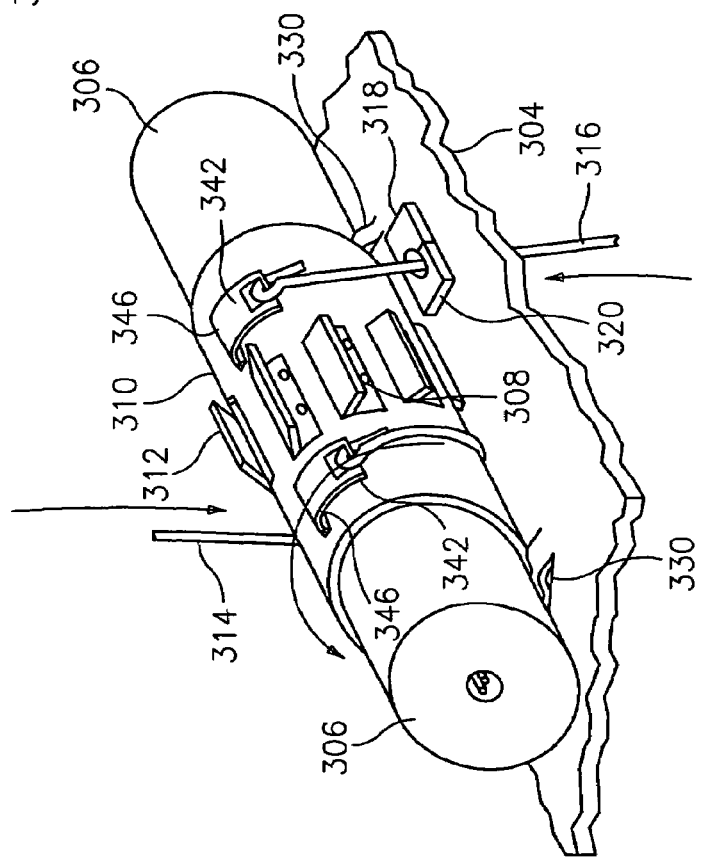
FIG. 17 is a perspective view of a spool with vanes positioned around the inflator and one or more tethers attached to the spool in accordance with an exemplary embodiment.

Referring now to FIG. 17, inflator 306 has gas outlet ports 308 where inflator gas is released upon inflator deployment. A spool 310 with vanes 312 is positioned around inflator 306 so that the vanes 312 align with the inflator gas outlet ports 308. One or more tethers 314, 316 are attached to the spool 310. Tether 314 may route to a component inside the air bag module 302 while tether 316 may route to a different component outside the air bag module 302. Tether 316 passes through an aperture 318 in air bag housing 304 and through a plug 320 lining aperture 318 so that tether 316 is not cut by an edge of the airbag housing 304 defining aperture 318.

Upon deployment of inflator 306, the inflator gases exit gas outlet ports 308 and contact spool vanes 312. Spool 310 then starts to rotate and tethers 314, 316 are wrapped onto spool 310. Tethers 314, 316 can be used to power a function either internal to or external to the air bag module 302.

Figure 18:
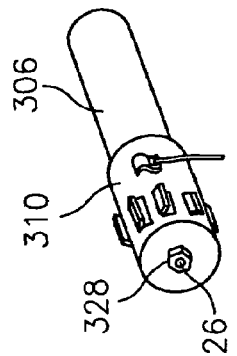
FIG. 18 is an alternative embodiment of FIG. 17 illustrating the spool disposed at one end of the inflator.

Spool 310 can be disposed around inflator 306 and positioned either at middle portion of inflator 306 as shown in FIG. 17 or spool 310 can be positioned at an end of inflator 306 as shown in FIG. 18. In FIG. 18, spool 310 is retained to a stud 326 extending from one end of the inflator 306 with a nut 328. In FIG. 17, spool 310 is optionally held in a middle portion of inflator 306 by protrusions 330 extending from housing 304. Alternatively, protrusions may extend from the inflator (not shown) or by a separate piece such as a cushion retainer or a clip (not shown).

Figure 19:
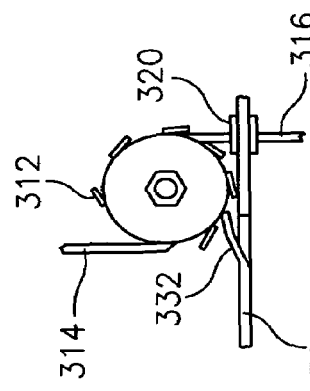
FIG. 19 is a side view of the perspective view illustrated in FIG. 18.

Referring now to FIG. 19, after spool 310 completes rotation, an optional reverse travel prevention feature 332 is optionally included to prevent reverse travel of the spool 310. It is envisioned that the reverse travel prevention feature 332 is made of a springy material and engage the spool vanes 312 or some other feature on the spool such as a protrusion (not shown). The reverse travel prevention feature 332 is optionally a component of the airbag module housing 304 or an adjacent structure (not shown).

Figure 20:
FIG. 20 is a cross section view of seals disposed intermediate the spool and the inflator.

To prevent binding of inflator 306 as a result of corrosion, to create smooth bearing surfaces 333, and to seal inflation gases, it may be desirable to have seals 334 as illustrated in FIG. 20. The seals 334 can be of various configurations and may be located where spool 310 could otherwise contact a stationary portion of airbag module 302. Seals 334 may be fabricated of silicone, for example, but is not limited thereto.

FIG. 21 shows a portion of airbag housing 304 that is used for applications where an inflator 324 pipes gas into a cushion (not shown). The cushion includes a roof rail air bag (not shown). A spool 322 is attached to the end of inflator 324 using nut 328. Housing 304 includes a first portion 336 and a second portion 338 threaded or otherwise mechanically attached thereto. Referring to FIGS. 21 and 22, the plug 320 through which tether 316 routes through is of a different shape than that shown in FIG. 17. In FIGS. 21 and 22, plug 320 includes an outer ring 340 configured to keep inflator gases inside housing 304. Seals (not shown) can be used to prevent gas leakage and create smooth surfaces for the spool 322 to interface with. In addition, a cup 341 is optionally included to help direct inflator gases toward an outlet hole 343 in housing 304.

Tethers 314, 316 can be made of various materials. If a fabric is used, tethers 314, 316 may be attached to spool 310, 322 in several manners. As shown in FIGS. 17 and 23, tether 314, 316 is sewn around a clip 342, 344 that is placed into holes 346, 348 on spool 310, 322. As shown in FIG. 24, tether 314, 316 is optionally disposed around a protrusion (tab) 350 in spool 310, 322. It is also possible to have a tether 314, 316 that is a metal strap 352 as shown in FIG. 25. In this case, metal strap 352 is configured with a bent tab 354 placed into hole 346 on spool 310, 322. Alternatively or in addition, metal strap 352 may be welded to spool 310, 322.

A system having inflator 306 and spool 310, 322 having tether 314, 316 operably attached as in the exemplary embodiments described above with reference to FIGS. 17-25 may be used to power numerous functions within a vehicle. For example, such a system may be used to extend a knee bolster as described with reference to FIGS. 6-15.

As shown in FIG. 26, a lower tether 356 is routed in a roof rail air bag 358, where the lower tether 356 may be tightened using the approach described above with reference to FIGS. 17-25. A tether guide 360 is optionally used to help route tether 356 into housing 304.

As shown in the deployment progression in FIGS. 27-29, lower tether 356 may be attached to and used to position a flap 362 in a roof rail air bag application as it is pulled tight during deployment of inflator 306.

In addition, as shown in FIG. 30, it may be possible to attach tether 314 to a portion of an airbag cushion 364 and pull that portion of cushion 364 in during deployment, in accordance with another exemplary embodiment.

In all cases, initial slack may or may not be present in tether 314, 316. The amount of slack present is optionally used to tune the timing and aggressiveness of the pull on tether 314, 316. When a function of a pulling tether 314, 316 is completed, there are several ways to prevent excessive tension buildup in tether 314, 316. In one example, tether 314, 316 can be made from a stretchable material that will stretch once the function is completed. Alternatively, tether 314, 316 optionally includes an energy-absorption feature. One such energy-absorption feature, for example, includes tear stitching 366, as illustrated in FIG. 31.

FIG. 32 illustrates a sequential assembly and operation of an alternative exemplary embodiment of a release mechanism for tether 314, 316. One end 368 of tether 314, 316 is attached to a piece 370 that is initially releasably retained by a block 372 slidably disposed between a pair of receiving members 374, 376. When tether 314, 316 is pulled so that the function is complete, piece 370 at one end of tether 314, 316 is released from block 372, since a cavity 378 receiving piece 370 is exposed from being between members 374, 376. It will be recognized by one skilled in the pertinent art however, that there are numerous ways in which to hold onto and release a tether from a mechanism, other than the components described with reference to FIG. 32. For example, it is envisioned that tether 314, 316 can contact a knife edge and be cut by the knife edge once the tether has been pulled to a location where the function is complete. It will be further recognized that block 372 can be operably attached to first rigid end cap 110.

Figure 33:
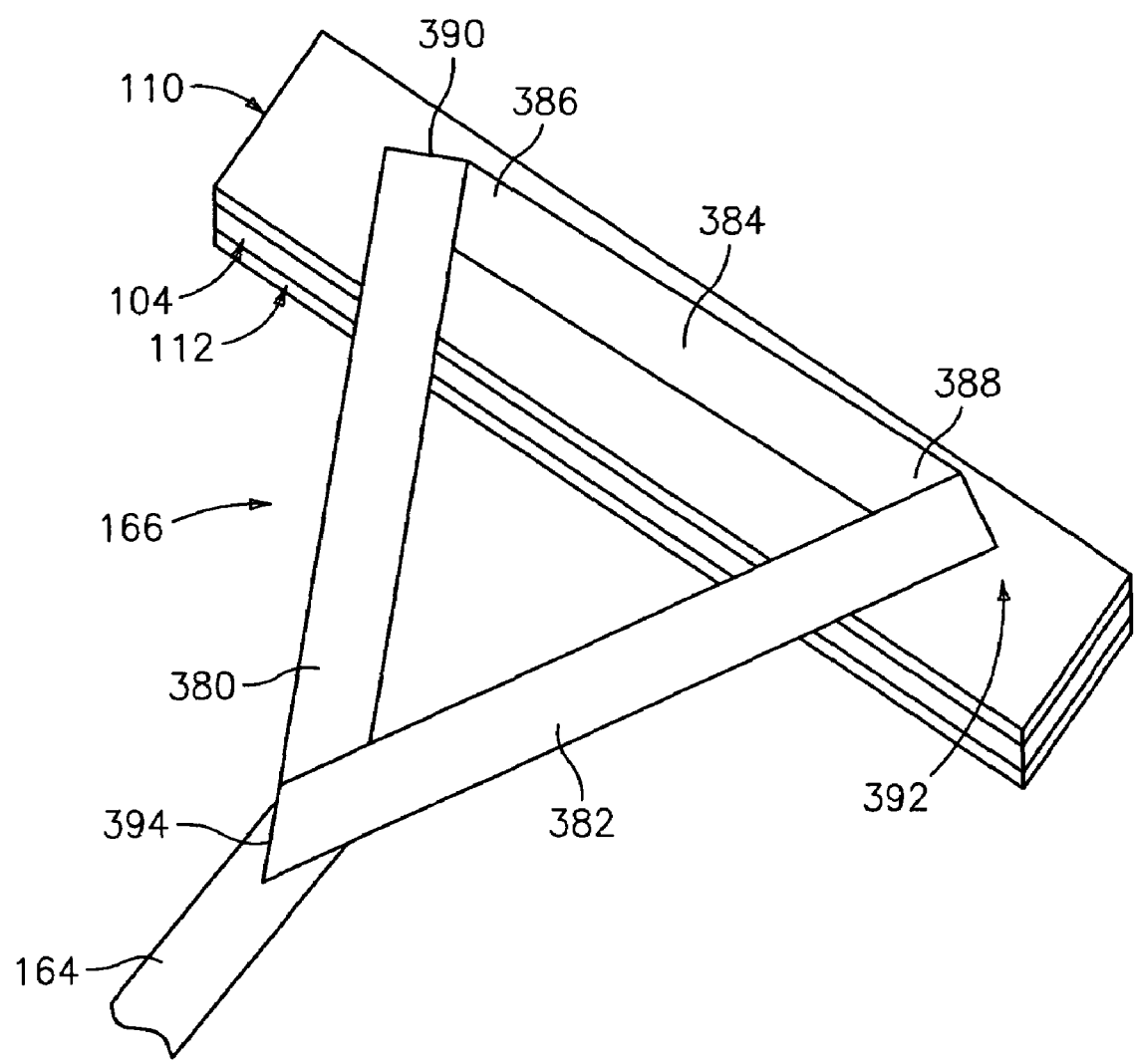
FIG. 33 is a perspective view of one end of the tether including two folds and attached to an end cap to facilitate deployment.
Figure 34:
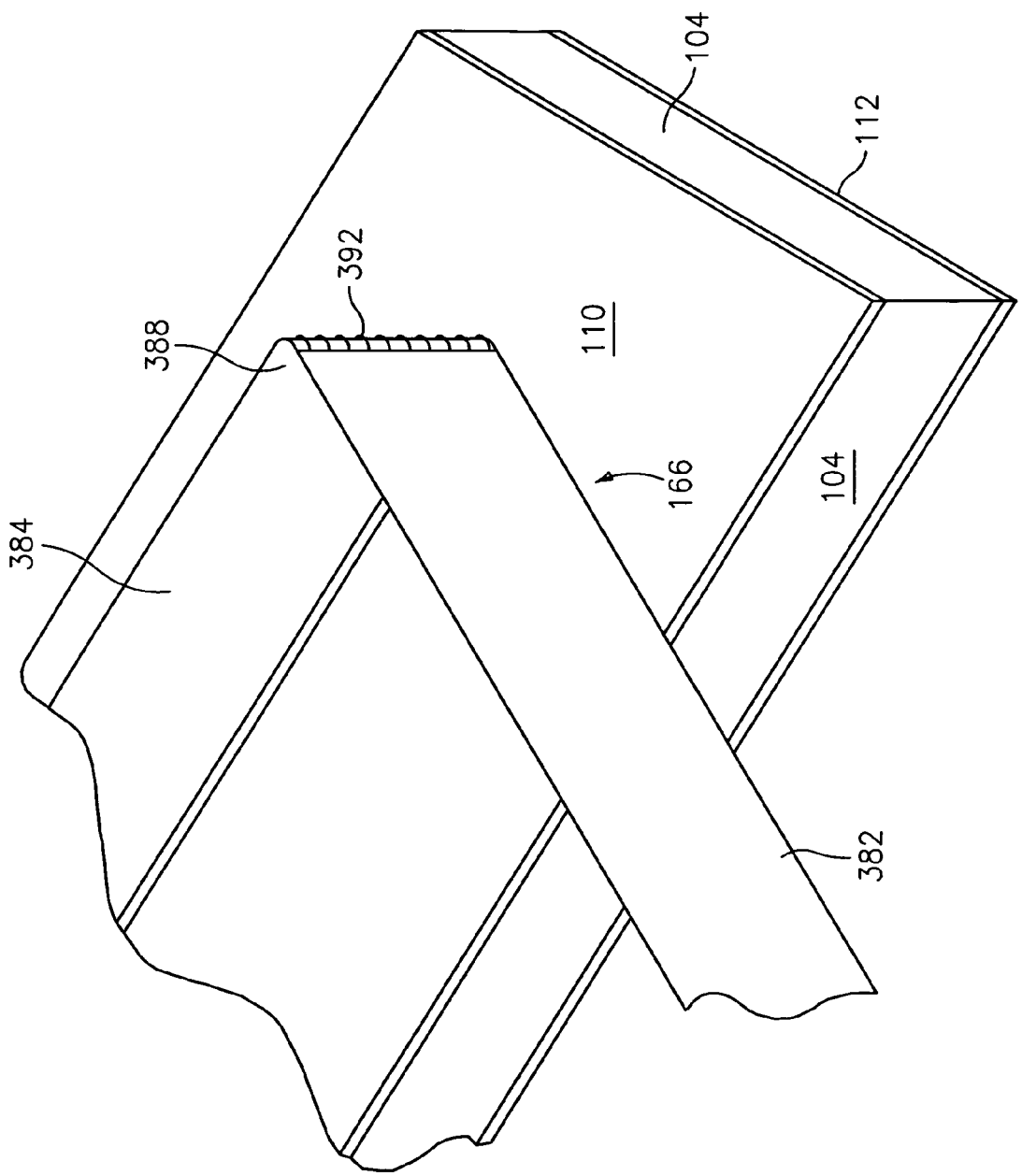
FIG. 34 is an enlarged view of FIG. 33 illustrating one of the to folds in detail.

Referring now to FIGS. 33 and 34, first and second rigid end caps 110 and 112, respectively, are illustrated having unexpanded honeycomb celled material 104 disposed therebetween. One end 166 of tether 164 is operably coupled to first rigid end cap 110. In particular, one end 166 of tether 164 operably attached to the first rigid end cap is defined by first and second portions 380 and 382, respectively, having an intermediate portion 384 therebetween. A flat broad side defining one surface of intermediate portion 384 of tether 164 is affixed to first rigid end cap 110. Intermediate portion is defined by outboard ends 386 and 388 corresponding to folds 390 and 392, respectively, defining the corresponding first and second portions 380, 382, respectively, extending from the outboard ends 386, 388 of the intermediate portion. The first and second portions 380, 382 each defining terminal ends opposite corresponding folds 390, 392 are coupled to each other generally indicated at 394 as best seen in FIG. 33. First and second portions 380, 382 direct energy from the deployment means (not shown) to translate outer bolster 170 rearward (FIGS. 6 and 11-15).

More specifically, as tether 164 unfolds at the corresponding folds 390, 392, outer bolster 170 is forced to translate rearward providing a path for honeycomb celled material 104 to expand. The fold initiates rotation and proper orientation of the unexpanded aluminum honeycomb material and directs the energy from the deployment system operably connected to end 162 of tether 164 to translate the outer bolster 170 rearward providing a path for the honeycomb celled material 104 as it expands. Tether folds 390, 392 permit the unexpanded honeycomb celled material to be packaged in the instrument panel 142, parallel to a show surface. When the crash sensor or SDM senses a collision, tether 164 is pulled. When the tether folds 390, 392 unfold, the outer bolster 170 is forced to translate rearward and the honeycomb celled material 104 is pulled into the proper deployment orientation. In this manner, the outer bolster 170 can be deployed without an added mechanism while enabling a more spacious vehicle interior.

In an exemplary embodiment, expandable aluminum honeycomb celled material 104 is used to provide energy management for protection of unbelted occupants. The honeycomb material is installed between the instrument panel retainer or inner bolster 172 and the steering column filler or outer bolster 170, in an unexpanded state. When the vehicle sensors detect a frontal collision, a sensor generates a signal to a deployment mechanism to actuate and expand honeycomb celled material 104 via tether 164 pulling on first rigid end cap 110 operably coupled to a movable end of the honeycomb celled material. The honeycomb celled material then expands forcing the outer bolster 170 rearward toward a selected bolster zone. This deployment can be accomplished using various means as described above in the exemplary embodiments and understood and appreciated by those skilled in the pertinent art.

The aluminum honeycomb material expands to 60 times its original thickness and can be deployed with 1/10 the energy the material manages when deployed. The use of the metallic honeycomb celled material, such as aluminum, for example, can improve protection of occupants, as well as improve spaciousness or a balance of both.

The above described exemplary embodiments provide an energy management deployment system that can be easily carried from one vehicle design to another with minimal work and allows easy tuning for specific vehicle parameters and accommodation of a larger range of occupant sizes. Furthermore, the energy management deployment system increases crash performance, while enabling a more spacious interior and more styling flexibility. For example, the energy management deployment system compensates for angled glove box door and steering column filler designs, while providing a parallel loading surface when needed.

To those skilled in the art to which this invention appertains, the above-described preferred embodiment may be subject to change or modification. Such change or modification can be carried out without departing from the scope of the invention, which is intended to be limited only by the scope of the appended claims.

The invention claimed is:

1. A volume-filling mechanical structure for modifying a crash comprising:
    a bolster system defined by an outer bolster and an inner bolster;
    a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states;
    an activation mechanism configured for deploying said honeycomb celled material from said dormant state to said deployed state causing the outer bolster to translate away from the inner bolster;
    a tether operably connecting said honeycomb celled material to said activation mechanism configured for deploying said honeycomb celled material from said dormant state to said deployed state; and
    a first rigid end cap connected to a first end of the honeycomb celled material and a second rigid end cap connected to a second end of the honeycomb celled material;
    wherein the first rigid end cap includes a wedge or is wedge-shaped to facilitate translation of the outer bolster away from the inner bolster upon deployment of the honeycomb celled material.

2. The volume-filling mechanical structure of claim 1, wherein the outer bolster includes an exposed surface of an instrument panel.

3. The volume-filling mechanical structure of claim 2, wherein the exposed surface of the instrument panel includes one of a glove box door and a steering column filler.

4. The volume-filling mechanical structure of claim 3, wherein the honeycomb celled material expandable to a deployed state translates the glove box door or steering column filler.

5. The volume-filling mechanical structure of claim 1, wherein the honeycomb celled material comprises a metallic composition.

6. The volume-filling mechanical structure of claim 1, wherein the first rigid end cap is operably connected to said tether to aid deployment by said activation mechanism; and wherein the second rigid end cap is mechanically attached to one of a lower or upper portion defining the bolster system.

7. The volume-filling mechanical structure of claim 1, wherein said activation mechanism for deploying said honeycomb celled material from said dormant state to said deployed state causing the outer bolster to translate away from the inner bolster includes one of a biasing member and an airbag operably connected to one end of said tether.

8. A volume-filling mechanical structure for modifying a crash comprising:
    a bolster system defined by an outer bolster and an inner bolster;
    a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states;
    a biasing member configured for deploying said honeycomb celled material from said dormant state to said deployed state causing the outer bolster to translate away from the inner bolster; and a tether operably connecting said honeycomb celled material to said biasing member configured for deploying said honeycomb celled material from said dormant state to said deployed state;

wherein said biasing member is a spring receptive to storing energy to deploy the honeycomb celled material; and wherein the spring is housed in a housing, said housing having a length of between a first length of a spring free length and a second length of the spring free length plus a length of a desired extension of said honeycomb celled material for a desired knee bolster protection.

9. The volume-filling mechanical structure of claim 8, wherein the stored energy in the spring is released via actuation of a solenoid in operable communication therewith.

10. The volume-filling mechanical structure of claim 8, wherein the spring is disposed about a steering column, the spring defined by a fixed end and a movable end, the tether being attached to the movable end.

11. The volume-filling mechanical structure of claim 8, wherein said biasing member includes a coil spring system, the coil spring system comprising:

a housing having an opening receptive to said tether therethrough;

a spool rotatably disposed within said housing, the one end of the tether being coiled therearound; and the coil spring operably connected to said spool and disposed within said housing, wherein the coil spring is receptive to the storing of energy to deploy the honeycomb celled material by coiling the tether around the spool.

12. The volume-filling mechanical structure of claim 11, further comprising a sensing and diagnostic module configured to sense a collision and provide a signal to a solenoid configured to release the coil spring to coil the tether on the spool.

13. The volume-filling mechanical structure of claim 7, wherein when the one end of the tether is operably connected to the airbag, deployment of the airbag pulls said tether and deploys the honeycomb celled material.

14. The volume-filling mechanical structure of claim 13, wherein the airbag is a passenger side airbag operably connected to the one end of the tether while an opposite end of the tether is operably connected to the honeycomb celled material.

15. A volume-filling mechanical structure for modifying a crash comprising:

a bolster system defined by an outer bolster and an inner bolster;

a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states;

a first rigid end cap connected to a first end of the honeycomb celled material and a second rigid end cap connected to a second end of the honeycomb celled material;

an activation mechanism configured for deploying said honeycomb celled material from said dormant state to said deployed state causing the outer bolster to translate away from the inner bolster; and a tether operably connecting said honeycomb celled material to said activation mechanism configured for deploying said honeycomb celled material from said dormant state to said deployed state;

wherein the one end of the tether operably coupled to the first rigid end cap is defined by first and second portions having an intermediate portion therebetween, the intermediate portion affixed to the first rigid end cap, the intermediate portion defined by outboard ends corresponding to folds in the one end of the tether defining the corresponding first and second portions extending from the outboard ends of the intermediate portion, the first and second portions each defining terminal ends opposite corresponding folds are coupled to each other, wherein first and second portions direct energy from said activation mechanism to translate the outer bolster rearward.

16. The volume-filling mechanical structure of claim 15, wherein when the tether unfolds at the corresponding folds, the outer bolster is forced to translate, thereby providing a path for the honeycomb celled material to expand.

17. The volume-filling mechanical structure of claim 7, wherein said activation mechanism is configured to harness energy from the airbag to provide power to expand the honeycomb celled material.

18. The volume-filling mechanical structure of claim 17, wherein the one end of the tether is attached to the airbag.

19. The volume-filling mechanical structure of claim 17, wherein the one end of the tether is wrapped on a spool rotatable by deployment of the airbag.

20. The volume-filling mechanical structure of claim 19, wherein the spool is disposed around an airbag inflator receptive to rotating when loaded by impinging inflator gases to wind up the tether.

* * * * *